(12) United States Patent
Murakami et al.

(10) Patent No.: US 7,133,792 B2
(45) Date of Patent: Nov. 7, 2006

(54) METHOD AND APPARATUS FOR CALIBRATION OVER TIME OF HISTOLOGICAL AND PHYSIOLOGICAL BIOMETRIC MARKERS FOR AUTHENTICATION

(75) Inventors: Rick V. Murakami, North Ogden, UT (US); Clark Hinton, Glendale, AZ (US); Matthew W. Pettit, Mountain Green, UT (US)

(73) Assignee: Ensign Holdings, LLC, Salt Lake City, UT (US)

( * ) Notice: Subject to any disclaimer, the term of this patent is extended or adjusted under 35 U.S.C. 154(b) by 0 days.

(21) Appl. No.: 09/815,568

(22) Filed: Mar. 23, 2001

(65) Prior Publication Data

US 2002/0138743 A1   Sep. 26, 2002

Related U.S. Application Data

(60) Provisional application No. 60/210,270, filed on Jun. 8, 2000.

(51) Int. Cl.
*G01C 19/00* (2006.01)

(52) U.S. Cl. .................................. 702/104; 713/186

(58) Field of Classification Search ............... 702/104, 702/179; 713/186, 202, 176; 380/25; 726/16, 726/5; 382/115, 124, 116; 235/380; 340/5.52
See application file for complete search history.

(56) References Cited

U.S. PATENT DOCUMENTS

| | | | |
|---|---|---|---|
| 4,537,484 A | 8/1985 | Fowler et al. ................ 354/62 |
| 4,544,267 A | 10/1985 | Schiller ....................... 356/71 |
| 4,699,149 A | 10/1987 | Rice .......................... 128/664 |
| 4,728,186 A | 3/1988 | Eguchi et al. ................ 356/71 |
| 4,784,484 A | 11/1988 | Jensen ......................... 356/71 |
| 5,073,950 A | 12/1991 | Colbert et al. ................ 382/2 |
| 5,077,803 A | 12/1991 | Kato et al. .................... 382/4 |
| 5,088,817 A | 2/1992 | Igaki et al. ................... 356/71 |
| 5,103,486 A | 4/1992 | Grippi ......................... 382/4 |
| 5,230,025 A | 7/1993 | Fishbine et al. ............... 382/4 |
| 5,335,288 A | 8/1994 | Faulkner ....................... 382/4 |
| 5,623,552 A | 4/1997 | Lane .......................... 382/124 |
| 5,666,400 A | 9/1997 | McAllister et al. ........... 379/67 |
| 5,719,950 A | 2/1998 | Osten et al. ................ 382/115 |
| 5,737,439 A | 4/1998 | Lapsley et al. ............. 382/115 |
| 5,774,571 A | 6/1998 | Marshall .................... 382/119 |
| 5,892,824 A * | 4/1999 | Beatson et al. ............... 380/52 |
| 5,987,232 A | 11/1999 | Tabuki .................... 395/187.01 |
| 6,104,913 A | 8/2000 | McAllister ................... 455/41 |
| 6,104,922 A | 8/2000 | Baumann .................... 455/410 |
| 6,148,094 A | 11/2000 | Kinsella .................... 382/124 |
| 6,148,407 A * | 11/2000 | Aucsmith .................... 713/202 |
| 6,164,403 A | 12/2000 | Wuidart ..................... 180/287 |
| 6,171,112 B1 | 1/2001 | Clark et al. ................. 434/322 |
| 6,182,892 B1 | 2/2001 | Angelo et al. .............. 235/380 |
| 6,193,153 B1 | 2/2001 | Lambert .................... 235/380 |
| 6,202,151 B1 | 3/2001 | Musgrave et al. ........... 713/186 |
| 6,208,264 B1 | 3/2001 | Bradney et al. ....... 340/825.31 |
| 6,225,890 B1 | 5/2001 | Murphy ..................... 340/426 |
| 6,232,874 B1 | 5/2001 | Murphy ..................... 340/426 |
| 6,256,737 B1 * | 7/2001 | Bianco et al. .............. 713/186 |
| 6,269,348 B1 | 7/2001 | Pare, Jr. et al. .............. 705/39 |
| 6,275,806 B1 | 8/2001 | Pertrushin ................... 704/272 |
| 6,289,453 B1 | 9/2001 | Walker et al. ............. 713/175 |
| 6,591,224 B1 * | 7/2003 | Sullivan et al. ............. 702/179 |

FOREIGN PATENT DOCUMENTS

EP       1081632 A1 *   3/2001
JP       2000--181871     6/2000

* cited by examiner

*Primary Examiner*—Michael Nghiem
*Assistant Examiner*—Xiuqin Sun

(57) ABSTRACT

The present invention is directed toward a method for calibrating a biometric authentication device over time. The method of the present invention involves obtaining an authenticating biometric value from a biometric measurement. The biometric value is then weighted and integrated into the authentication data set or template.

39 Claims, No Drawings

METHOD AND APPARATUS FOR CALIBRATION OVER TIME OF HISTOLOGICAL AND PHYSIOLOGICAL BIOMETRIC MARKERS FOR AUTHENTICATION

RELATED APPLICATION

This application claims priority to the U.S. Provisional Application 60/210,270 filed Jun. 8, 2000, titled "METHOD AND APPARATUS FOR HISTOLOGICAL AND PHYSIOLOGICAL BIOMETRIC OPERATION AND AUTHENTICATION."

BACKGROUND

1. Field of the Invention

The present invention relates to a method and apparatus for calibrating a biometric marker over time for the purpose of authenticating the person. More specifically, the present invention relates to methods and apparatus for calibrating an internal biometric marker that is substantially unique to a person in order to permit the person to activate a device, participate in a transaction, or identify him or herself.

2. The Background Art

The computer industry has recognized a growing need for sophisticated security systems for computer and electronic devices. The security systems prevent unauthorized use and authenticate or identify individuals through electronic means. The biometric authentication industry has developed in response to this need. Biometrics are the measurement of quantifiable biological traits. Certain biological traits, such as the unique characteristics of each person's fingerprint, have been measured and compared and found to be unique or substantially unique for each person. These traits are referred to as biometric markers. The computer and electronics industry is developing identification and authentication means that measure and compare certain biometric markers with the intention of using the markers as biological "keys" or "passwords."

Biometric markers presently used by the industry for authentication and identification include the use of measurements of unique visible features such as fingerprints, hand and face geometry, and retinal and iris patterns, as well as the measurement of unique behavioral responses such as the recognition of vocal patterns and the analysis of hand movements. The use of each of these biometric markers requires a device to make the biological measurement and process it in electronic form. The device may measure and compare the unique spacing of the features of a person's face or hand and compare the measured value with a value stored in the device's memory. Where the values match, the person is identified or authorized.

Several types of technologies are used in biometric identification of superficial anatomical traits. For example, biometric fingerprint identification systems may require the individual being identified to place their finger on a visual scanner. The scanner reflects light off of the person's finger and records the way the light is reflected off of the ridges that make up the fingerprint. Hand and face identification systems use scanners or cameras to detect the relative anatomical structure and geometry of the person's face or hand. Different technologies are used for biometric authentication using the person's eye. For retinal scans, a person will place their eye close to or upon a retinal scanning device. The scanning device will scan the retina to form an electronic version of the unique blood vessel pattern in the retina. An iris scan records the unique contrasting patterns of a person's iris.

Still other types of technologies are used for biometric identification of behavioral traits. Voice recognition systems generally use a telephone or microphone to record the voice pattern of the user received. Usually the user will repeat a standard phrase, and the device compares the measured voice pattern to a voice pattern stored in the system. Signature authentication is a more sophisticated approach to the universal use of signatures as authentication. Biometric signature verification not only makes a record of the pattern of the contact between the writing utensil and the recording device, but also measures and records speed and pressure applied in the process of writing.

Each of the prior art systems has a number of disadvantages. For example, fingerprint data bases may raise significant privacy issues for those whose information is entered in the system. Hand and facial geometry recognition systems may require large scanners and/or expensive cameras. Voice recognition devices have problems screening out background noise. Signature recognition devices are subject to variations in the behavior of the individual. Retinal devices may require users to place their eye close to or on a scanning device, exposing the user to potential infection.

Another disadvantage of the prior art to biometric authentication is the limited number of biometric markers that are unique to each individual and that are practical for implementing in computer and electronic devices. Because the biometric patterns used in the prior art to authenticate a person are potentially completely unique to each person, the differences that distinguish one person from another person may be subtle. It may require a high degree of electronic sophistication to read and differentiate between the various unique aspects of the biometric marker. If the biometric marker is used to identify an individual from a large group of individuals, the computer memory storage and processing capability may also have to be sophisticated, and therefore, may be expensive.

Another disadvantage of prior art is that with relatively few truly unique biometric markers, it is likely that those markers will be used in multiple devices. Use in multiple devices of the limited number of unique markers increases the risk of harm to the authorized user in the event an unauthorized person is able to forge or otherwise counterfeit one of the unique biometric markers. This is the same problem that exists when a person chooses the same alphanumeric password for all his accounts or electronic devices. Markers that are difficult to forge, and a greater number of them, are needed to reduce the potential harm to the authorized user from forged our counterfeit marks.

U.S. Pat. No. 4,537,484 to Fowler et al. discloses a fingerprint imaging apparatus for use in an identity verification system. The system uses light, which is reflected off the finger through a system of mirrors to a linear photo diode ray. The fingers rotated mechanically in order to scan the entire fingerprint.

U.S. Pat. No. 4,544,267 to Shore discloses an identification device that uses a beam of collimated light to scan the fingerprint. The light beam is then imaged onto a linear ray of photo-responsive devices. The information is processed to provide a set of signals containing fingerprint information.

U.S. Pat. No. 4,699,149 to Rice discloses a device for detecting the position of subcutaneous blood vessels such as by using the reflection of incident radiation off of a user's skin. The measured pattern is then compared with a previously determined pattern to verify the identity of the user.

U.S. Pat. No. 4,728,186 to Eguchi et al. discloses another method for detecting data an uneven surface such as a finger, namely a fingerprint, using a light source illuminating the uneven surface through a transparent plate.

U.S. Pat. No. 4,784,484 to Jensen discloses an apparatus for automatic scanning of a fingerprint using an optical scanner. The user slides his finger across a scanning surface and an optical scanning system generates an electrical signal as a function of the movement of the finger across the optical scanning surface.

U.S. Pat. No. 5,073,950 to Colbert et al. discloses a method and apparatus for authenticating and verifying the identity of an individual based on the profile of a hand print using to an optical scanner.

U.S. Pat. No. 5,077,803 to Kito et al. discloses a fingerprint collating system employing a biological detecting system.

U.S. Pat. No. 5,088,817 discloses an apparatus for detecting and identifying a biological object by projecting a light beam onto the object and detecting the reflective light using an optical detector. The change in the wave length characteristics of the light beam can be compared to a previously determined pattern.

U.S. Pat. No. 5,230,025 discloses a system for generating data characteristics of a rolled skin print using an optical device that can convert reflective light beams into an electronic signal and generate digital data representative of the image of the skin print.

U.S. Pat. No. 5,335,288 to Faulkner discloses a biometric measuring apparatus that uses silhouette and light images to measure a person's hand features. The features are converted to electronic data and stored and later compared for identification purposes.

Some biometric authentication systems combine biometric measurements with conditions behavior such as signature writing styles and voice patterns or intonations. For example, U.S. Pat. No. 5,103,486 to Grippey discloses a signature verification system utilizing a handheld writing implement that produces data regarding a person's fingerprint pattern and their hand written signature.

Other biometric authentication systems include means for verifying physiological activity. These means for verifying physiological activity are primarily to prevent an unauthorized person from using dead tissues as a means for circumventing the authentication process. For example, U.S. Pat. No. 5,719,950 to Osten et al. discloses a personal biometric authentication system wherein inherently specific biometric parameters are measured and recognized and at least one non-specific biometric parameter is recognized and compared with physiological norms. Likewise, U.S. Pat. No. 5,727,439 to Lapsley et al. discloses an antifraud biometric scanner that determines whether blood flow is taking place in the object being scanned and whether such blood flow is consistent with that of a living human.

One of the difficulties arising from the use of biometric markers for authentication is that the changes that occur in a person's features or physiology over time can alter the measurement of those features and physiology and result in a false negative identification. For example, if a person's facial features are used as a means of biometric identification, and through age or accident the person's features are changed, biometric identification based upon the person's features prior to the change may not be possible. In order to take into account such changes, some biometric authentication systems that rely upon superficial structure or behavioral response have proposed methods for calibrating the authenticating biometric over time.

U.S. Pat. No. 5,892,824 to Beatson et al. discloses a biometric template updating process for signature verification, in which an original signature template is modified based on a feature comparison process used in authentication that results in an updated authenticating signature template. U.S. Pat. No. 6,111,517 to Atick et al. in which a face recognition biometric device periodically updates the image memory used to authenticate the individual to reflect changes in the appearance of the individual.

The calibration over time of internal physiological and histological markers is complicated by the aging that takes place in the body. The aging process affects the organ systems in the body, which may result in an alteration of the physiological or histological markers. For example, in the integumentary system, as the body ages a degenerative change occurs in collagenous and elastic fibers within the dermis, there is decreased production of pigment in the skin and hair follicles and reduced activity of sweat and sebaceous glands. the body's skin tends to become thinner, more wrinkled and dry with pigmentation spots and the hair becomes gray and ultimately white. Within the skeletal system there is a degenerative loss of matrix, a deterioration of the joints and articulations, bones generally become thinner and more brittle.

Within the muscular system there is a loss of skeletal muscle mass, muscular strength, and motor response. In the circulatory system, the cardiac muscle degenerates and there is decreased diameters of the lumina of the arteries and arterioles, decreased cardiac output, increased resistance to blood flow, and increased blood pressure. With the respiratory system, aging brings on a degenerative loss of elastic fibers in the lungs, a reduced number of functional alveoli, and a reduced vital capacity. Other systems within the body suffer similar degernative effects with aging.

Unlike the calibration issues addressed in superficial biometric markers or behavioral markers, internal physiological and histological markers undergo different kinds of changes. These changes are for the most part invisible and unlike superficial biometric markers, may give no obvious indicia of the change. Likewise, many of the changes in the body systems are largely involuntary responses. These physiological markers do not provide the individual being authenticated an opportunity to try to compensate for whatever changes may occur over time. The changes which occur in internal biometric markers are highly individualized in terms of their timing and degree of change, and therefore may not be compensated for by calibration methods not tailored to the actual changes occurring but are rather predetermined by some other method. Lastly, because internal biometric markers are often combined to form a "compound" biometric marker comprised of a number of physiological and histological features, calibration can be more complicated. In the preferred embodiments of the related applications, multiple features of a physiological event are measured and a select number of the features are used depending on the consistency and distinctiveness of the features. Thus, the features used to authenticate and identify one individual using the system will be different than those features used to identify another individual. With such a system, it is important that the calibration techniques take into account the unique nature of the internal biometric marker.

It would therefore be advantageous to provide a method and software for calibrating internal biometric markers and specifically calibrating internal physiological and histological biometric markers over time.

It would also be advantageous to provide a method and apparatus for biometric authentication and activation that does not exclusively rely upon the measurement of superficial anatomical structure and/or behavioral responses and can be calibrated over time. It would also be advantageous to provide a biometric authentication system that is relatively inexpensive and portable. It would be a further advantage to provide a biometric authentication system that can use but does not require the use of truly unique biometric markers where such markers can be calibrated over time. It would also be advantageous to provide a method and apparatus for biometric authentication that can use a single technology to measure multiple, varied biometric markers.

BRIEF SUMMARY AND OBJECTS OF THE INVENTION

The present invention comprises the step of obtaining an authenticating or affirmative biometric value from within a range of authenticating biometric values weighting those values and integrating the values into an authentication data set or template. The biometric values are based upon a measurement of an internal biometric marker, such as an internal physiological or histological biometric marker. The measurement of the internal biometric marker results in a quantitative data set that can then be compared with an authenticating data set for the purposes of biometric identification and authentication. If the data set is confirmed to be authenticating, the data set can be stored electronically then used for purposes of calibration.

The present invention provides a method and apparatus for calibrating physiological and histological biometric markers over time. The biometric markers that are calibrated over time are substantially unique to each person, but not necessarily totally unique. In order to accomplish the present invention, in some cases specified calibration of the physiological/histological markers is necessary. The method of calibration biometric markers of the present invention does not merely calibrate the measurements of superficial anatomical structure or behavioral traits, but can also calibrate internal measurements of physiological traits of the various systems of the human body and/or are histological traits associated with tissues of the human body. These internal traits are calibrated to enhance the traits' capacity to function as a biometric marker. The present invention also contemplates the use of biometric markers that are not a composite of various internal physiological and/or histological traits. While the biometric markers of the present invention may be entirely unique to each person, markers that are not entirely unique but that are substantially unique may be used in the calibration over time and subsequent authentication process. The method of calibration over time of the present invention is capable of calibrating substantially unique biometric markers. The method is easily employed in a relatively compact and inexpensive device. The present invention employs a calibration method for use with biological markers that are substantially unique that remain relatively consistent from measurement to measurement and with markings that preferably are capable of being measured without physically invasive procedures.

The present invention provides an efficient method for employing internal biometric markers that might otherwise be impractical as they change over time. Internal markers that change over time can easily be used in conjunction with other biometric techniques to improve identification and enhance the security capabilities of the biometric identification methods. In particular, the calibration over time method of the present invention can greatly simplify the biometric measurement process.

Using biometric markers that may change over time, a variety of physiological markers can be measured and calibrated allowing for greater flexibility and variability in the markers used and design of the device. Contrary to the current trend in the biometric industry, the present invention does not limit the types of markers used to unchanging superficial anatomical structure or complex behavioral activity, and both simplifies and expands the potential applications for internal markers.

Internal biometric markers maybe based upon the traits of human tissue, which could change with time. Various kinds of human tissue, such as epithelial tissue, connective tissue, muscle tissue, and nervous tissue may change and thereby affect biometric characteristics. In a preferred embodiment of the present invention, dermal and subdermal tissues and their associated vasculature and musculature are employed to biometrically identify a user, even though these tissues may be changing over time. Through these tissues a physiological trait, such as the heartbeat of the user, is measured and then calibrated. For example, the depth of the various layers of epithelial tissue from a given point on the skin surface may be a changing histological trait that can be used as a biometric marker in conjunction with the strength of the heartbeat that also changes. The density of a particular kind of connective tissue, such as bone density, may be a changing histological trait that can be employed as could the light absorption characteristics of skin tissue could be a substantially unique histological trait.

The physiologically based biometric markers that change over time also benefit from the present invention. Specifically, when properly calibrated over time, various characteristics of a heartbeat wave form provide physiological markers that change over time but that do not require the scanning or mapping of anatomical structure. Neither do such heartbeat wave form markers require the analysis of volitional acts, as are required with voice or signature analysis. The present invention takes into account the fact that the heartbeat is a non-volitional, physiological process that occurs within the body. Other physiological processes that change over time can be used including processes associated with, but not limited to, the integumentary system, the skeletal system, the muscular system, the pulmonary system, the respiratory system, the circulatory system, the sensory system, the nervous system, the digestive system, the urinary system, the endocrine system, and the reproductive system. Included in the physiological biometric markers are those activities associated with the various physiological systems that occur automatically or, in other words, are non-volitional. All of these systems and related subsystems provide traits that change over time and that can be measured in a variety of ways to provide unique biometric markers calibrated over time using the present invention.

The method of the present invention for calibrating a biometric marker over a period of time comprises the steps of providing a biometric authentication template, wherein the template includes a set of authenticated biometric measurements. Associated with each measurement is a range of measurement value. To the extent an actual measurement falls within the range of authenticated, measurements, the actual measurement is considered to be an authenticating value. Every authenticating value is averaged into the authentication template, changing the template with each authenticated biometric measurement. A weighted average is used to adjust how much each authenticating measurement changes the template.

In one preferred embodiment, authenticating template is provided using the following process: acquiring a plurality of heartbeats from an individual in an electronic signal form; measuring a plurality of variable features of the electronic signals from the heartbeats; averaging the measurements of each of the signal features; subtracting the average of each measurement from the actual measurement to yield a centroid value; calculate the standard deviation of each measured value; divide the centroid value by the standard deviation for each measured feature to give a T-distribution input value; calculate the probability of the divergence of each measured value using the T-distribution; and input value in a T-distribution analysis.

The probability of divergence can be used to determine whether a subsequently recorded heartbeat signal is characterized by measured features that are significantly different than the template, that is, the authenticating range of measured features. If the measured features are considered "authenticating" when compared to the template, the biometric identification is positive. The measured authenticating features can then be weighted and averaged into the authenticating template, to calibrate the template over time.

In one embodiment, the a global probability that reflects in some way the probabilities for each of the measured features is established, and the global probability is used to compare with subsequently acquired heartbeats. The analysis can be in a univariate, bivariate or multivariate analysis. In bivariate and multivariate analysis, the probability calculations may have to be done using different techniques. A probability analysis for the bivariate may require performing a gamma distribution rather than a t-distribution and may further require the result of the centroid divided by the standard deviation to normalized.

The features can be weighted according to the ability or strength of the measured feature to act as a unique authenticator of a person.

The authenticating biometric measurements, such as an authenticating wave form are weighted before being averaged into the authenticating template. The method by which the authenticating measurements are weighted will depend upon the structure or format of the template. For example, if the template consists of a set of numeric values or range of numeric values associated with particular biometric measurements (such as the rate of a particular physiological process), the biometric measurement may be weighted using a simple multiplier. In this way, one actual biometric measurement will not significantly change the values of the authenticating data set when those measured values are averaged into the authenticating data set but several similar measurements over time can.

The process of weighting various biometric values can be implemented or altered to take into account the likelihood of change over time for a particular biometric marker or feature. Some biometric markers may have rates of change that are more or less universal for all people or the rate of change might be known for a specific individual. Where the rates of change are known, the weighting for those changing biometric markers can be adjusted appropriately. If it is known that a particular feature changes relatively rapidly over time, then greater weight may be given to the authenticating measurements of that feature to allow the calibration to keep pace with the rapidly changing feature.

The weighting may also take into account the relative differences between consecutive authenticating measurements and thereby automatically adjust the weighting for a particular measurement. If it appears that the actual authenticating measurements are consistently lower than the mean measurements in the authenticating template, the weighting of the features may be adjusted accordingly. Where a trend in a change is detected over a series of measurements or a significant departure from previous measurements is recorded, the weighting of the actual measurements may be adjusted as well.

The weighting may also take into account how often the user is employing the biometric authentication device. If there is a significant period of time between biometric measurements the weighting of those authenticating measurements may be adjusted to account for the likelihood of change over that period of time.

The process is carried out on a computerized device, such as any computer system or apparatus employing an electronic processor capable of manipulating data. The process may be embodied in a computer readable medium, such as a software program stored on a disk or drive or maybe a computer readable data transmission, such as a propagated signal. The method is presented to a user in a user interface format that facilitates the calibration of the heartbeat signal or waveform.

DETAILED DESCRIPTION OF THE PREFERRED EMBODIMENTS

The present invention describes a method and system for calibrating a biometric marker over time for authentication, using histological and physiological traits.

The method of the present invention comprises obtaining an authenticated biometric measurement. The measurement is authenticated by a process of comparing actual measurements to stored biometric measurements which represent the authenticating data set or template. The template may include specific values for biometric markers or ranges of values for biometric markers. The authenticated biometric measurement must have values that match or fall within the range of the authenticating values of the template. Optionally, the authenticated biometric measurements can be stored separately from the template in machine memory.

The authenticated biometric measurements are weighted and averaged or integrated into the template. By averaging the authenticating measurements into the template, the template can be altered to more closely match the authenticating biometric measurements. Preferably, the authenticating biometric measurements are weighted in order to determine how much of an effect the actual biometric measurements will have when they are averaged into the template.

In one preferred embodiment, univariate and bivariate biometric markers are weighted by assigning each marker a multiplier. A multiplier may be a mathematical function that is used to alter the authenticating template values. For example, a numeric value might be weighted by multiplying the numeric value by 0.001 before integrating the value of the authenticating biometric marker into the authenticating template.

Mathematical equations, functions, or values can be used to weight the authenticating biometric measurements. These equations, functions and values may be adapted as necessary and will differ depending on the type of biometric measurements taken and on the template or authentication data set used. Another criterion used to weight the authenticating biometric markers for inclusion in the template is whether the measurements are known to change in a particular way over time. Knowledge of such changes provides the opportunity to vary the weighting equation or value in a way that anticipates those changes.

Another criterion that may be considered in weighting an authenticated biometric measurement is whether a particular measurement fluctuates regularly. For example, over time it may be shown that a particular biometric measurement has a wide range of fluctuating measurements. Thus, the fluctuations may not be indicative of any particular permanent change and are as likely to affect the values in the template one way as another. To account for this fluctuation and prevent it from undesirably effecting the template, the authenticated biometric measurements of that particular marker or value can be given little or no weight when the authenticated biometric markers are averaged into the template.

The weighting values or multipliers themselves may be changed over time where such adaption is shown to be beneficial. For example, if the authenticated biometric measurements are stored separately from the template, and the values in the stored authenticated biometric measurements indicate a particular value is consistently different than the usual biometric readings, that biometric value may be assigned greater weight than it was initially assigned, in order to account for the apparent pattern of change. Such adaption could allow "bad" initial readings that form an authenticating template to be self-corrected and thereby reduce poor performance or false negatives. Additionally, if the stored authenticated biometric measurement indicate a distinct trend authenticating measurements can be weighted to adjust for a trend in differing values. Likewise, if a particular stored authenticated biometric measurement is stored and later compared with other prior and subsequent measurements to reveal a random variance between actual measurements and the template, the weighting of that particular biometric measurement can be changed accordingly.

Calibration itself as a whole may be adapted according to the frequency of use or the number of uses of the system. The authenticating biometric values may be given greater or less weight depending upon the frequency of use or number of uses.

In a preferred embodiment of the present invention, an infrared light is directed toward a specific part of a user's body, preferably the user's finger in order to acquire and store the user's heartbeat signal that can be calibrated to function as a biometric marker. The infrared light of the device penetrates the skin of the finger and is absorbed or reflected off the user's skin and subskin tissues and, specifically, arterial tissues. The reflected light is then received by the system and converted into an electronic signal, which can then be stored in some electronic format and calibrated for biometric authentication.

In this preferred embodiment of the present invention, a series of waveforms are initially measured and stored in an electronic form in a computerized device. The stored waveforms can then be normalized and used to generate a biometric marker template for authentication. The template is later compared to measured waveforms from subsequent users, and, based upon the statistical comparison between the template and the measured waveform, the subsequent user is granted or denied access to a device or authorization for transaction. As the wave form changes over time, the template is calibrated by averaging the authenticating measured waveforms into the template, using a weighted average.

The means for measuring, recording, and storing the waveform employed in the present invention may be any suitable means known in the art, to the extent that such means also allow for calibration of the waveform over time as disclosed and suggested herein. For example, measurement means includes measuring various levels of absorbed or deflected light rays, and electrical impulses and may further include but is not limited to devices capable of measuring pressure differentials, temperature changes, movement, distance, frequency, magnetics, physical interactions and luminescence.

One embodiment of the present invention comprises a device for capturing and calibrating a heartbeat wave form comprising a signal transmitter and a signal receiver communicating with a computer processor and machine memory. The signal transmitter transmits energy into dermal and subdermal tissues of the user of a biometric authentication device. The energy transmitted is partly absorbed into the tissues and partly reflected by the tissues. The signal receiver captures the reflected energy and measures the received signal to create a signal profile that represents the absorption and reflection of the signal. For the purposes of calibration several heartbeat wave forms are collected and stored. The signal data may be collected over any length of time reasonable for authentication purposes. At least one aspect of the data received represents a constant and repeatable characteristic or feature of the signal as absorbed and reflected by the tissues. Furthermore, at least one of the constant and repeatable characteristics is a characteristic that is substantially unique to each person. Preferably, multiple repeatable, relatively consistent features are measured. The resulting constant, repeatable, and substantially unique measurements are calibrated as explained below and are used as a biometric authenticator.

Anticipating that the physiological and anatomical attributes of a user of the present invention will change continuously over time, the present invention provides for a method of ongoing calibration or self-calibration. Self-calibration allows the calibrated, authenticating heartbeat signal or waveform to be modified to coincide with the changes in the user's physiological and anatomical attributes over time. For example, if the authentication system involves monitoring cardiovascular function, the user's heart function changes with time and the signal received from the authorized user may also slightly change over time. Thus, the authorized user's signal may be slightly different form the originally calibrated, authenticating signal.

In order to allow for the changes that occur in the user's body, the authentication program of the present invention provides for some degree of variance between the stored, authenticating biometric marker and an authorized user's waveform as measured at a given time. The program can track such variances over time and recalibrate the authenticating waveform to more closely match the slightly changed waveform of the authorized user, if necessary. Self-calibration allows the authenticating set of measurements (the template) to be recalibrated only within a statistical limit, to more closely match a gradually changing waveform of an authorized user. Thus, as small and insubstantial changes in the authorized user's waveform increase over time, the authenticating signal can also be changed. Self-calibration may be an automatic and continuous calibration that is performed upon each use of the authentication device or may occur at periodic intervals using recalibration data stored up during the period.

In another embodiment, over time, every time a person's waveform is measured and the waveform is authenticated, the values of the particular waveform are stored as part of an ongoing calibration process. The values may be incorporated into the existing authenticating set of marker measurements, but given little weight. Over time, if the authenticated waveform continues to be slightly, but consistently different from the actual wave form, small incremental changes to the overall authentication set result. Ongoing calibration will allow the device to continue to be used even though the authorized user's body is changing. For example, if a user's arteries begin hardening, the template would slowly adapt to situations over time, after a thousand or a hundred different ongoing authenticated waveforms are averaged into the template using a weighted average. If a user undergoes a dramatic, sudden change in body function, such as surgery or some form of aggressive therapy, total reprogramming of the authentication set or template may be required.

What is claimed is:

1. A method for calibrating a biometric authentication device over time comprising the steps of:
    obtaining an authenticating biometric value from an actual biometric measurement;
    adaptably weighting the authenticating biometric value;
    weighting the authenticating biometric value to accommodate for known changes in a biometric marker; and
    integrating and storing the adaptably weighted authenticating biometric value into an authenticating template stored in electronic form in a computerized device.

2. The method of claim 1 wherein the step of obtaining an authenticated biometric value comprises determining that a measured biometric value falls within a predetermined range of biometric values.

3. The method of claim 2 wherein the integration of the weighted value is accomplished by averaging the weighted value into the authenticating range of values.

4. The method of claim 3 wherein the step of averaging the weighted value further comprises multiplying the authenticating measured value by a multiplier.

5. The method of claim 1 wherein biometric value is adaptably weighted based upon consistent differences in authenticated measured biometric values.

6. The method of claim 1 wherein biometric value is adaptably weighted based upon trends in measured authenticating biometric values.

7. The method of claim 1 wherein biometric value is adaptably weighted based on the frequency of use of the biometric authentication device.

8. The method of claim 1 wherein biometric value is adaptably weighted based on the number of uses of the biometric authentication device.

9. The method of claim 1 wherein the authenticated biometric values are obtained by measuring histological biometric markers.

10. The method of claim 1 wherein the authenticating biometric values are obtained measuring a physiological biometric marker.

11. The method of claim 1 wherein the biometric values are univariate values.

12. The method of claim 1 wherein the biometric values are multivariate values.

13. The method of claim 1 wherein the biometric marker being measured is an internal biometric marker.

14. A device employing a biometric access system, said access system being adaptable to changes in a user's biometric over time, said device adapting to said changes by using the steps of:
    obtaining an authenticating biometric value from an actual biometric measurement;
    adaptably weighting the authenticating biometric value;
    weighting the authenticating biometric value to accommodate for known changes in a biometric marker; and
    integrating and storing the adaptably weighted authenticating biometric value into an authenticating template stored in electronic form in a computerized device.

15. The device of claim 14 wherein the step of obtaining an authenticated biometric value comprises determining that a measured biometric value falls within a predetermined range of biometric values.

16. The device of claim 15 wherein the integration of the weighted value is accomplished by averaging the weighted value into the authenticating range of values.

17. The device of claim 16 wherein the step of averaging the weighted value further comprises multiplying the authenticating measured value by a multiplier.

18. The device of claim 14 wherein the biometric marker being measured is an internal biometric marker.

19. The device of claim 14 wherein biometric value is adaptably weighted based upon consistent differences in authenticated measured biometric values.

20. The device of claim 14 wherein biometric value is adaptably weighted based upon trends in measured authenticating biometric values.

21. The device of claim 14 wherein biometric value is adaptably weighted based on the frequency of use of the biometric authentication device.

22. The device of claim 14 wherein biometric value is adaptably weighted based on the number of uses of the biometric authentication device.

23. The device of claim 14 wherein the authenticated biometric values are obtained by measuring histological biometric markers.

24. The device of claim 14 wherein the authenticating biometric values are obtained measuring a physiological biometric marker.

25. The device of claim 14 wherein the biometric values are univariate values.

26. The device of claim 14 wherein the biometric values are multivariate values.

27. A computer readable medium containing instructions for controlling calibration of a biometric marker for use in a biometric authentication device, by:
    obtaining an authenticating biometric value from an actual biometric measurement;
    adaptably weighting the authenticating biometric value;
    weighting the authenticating biometric value to accommodate for known changes in a biometric marker; and
    integrating and storing the weighted authenticating biometric value into an authenticating template stored in electronic form in a computerized device.

28. The computer readable medium of claim 27 wherein the step of obtaining an authenticated biometric value comprises determining that a measured biometric value falls within a predetermined range of biometric values.

29. The computer readable medium of claim 28 wherein the integration of the weighted value is accomplished by averaging the weighted value into the authenticating range of values.

30. The computer readable medium of claim 29 wherein the step of averaging the weighted value further comprises multiplying the authenticating measured value by a multiplier.

31. The computer readable medium of claim 27 wherein the biometric marker being measured is an internal biometric marker.

32. The computer readable medium of claim 27 wherein biometric value is adaptably weighted based upon consistent differences in authenticated measured biometric values.

33. The computer readable medium of claim 27 wherein biometric value is adaptably weighted based upon trends in measured authenticating biometric values.

34. The computer readable medium of claim 27 wherein biometric value is adaptably weighted based on the frequency of use of the biometric authentication device.

35. The computer readable medium of claim 27 wherein biometric value is adaptably weighted based on the number of uses of the biometric authentication device.

36. The computer readable medium of claim 27 wherein the authenticated biometric values are obtained by measuring histological biometric markers.

37. The computer readable medium of claim 27 wherein the authenticating biometric values are obtained measuring a physiological biometric marker.

38. The computer readable medium of claim 27 wherein the biometric values are univariate values.

39. The computer readable medium of claim 27 wherein the biometric values are multivariate values.

* * * * *

UNITED STATES PATENT AND TRADEMARK OFFICE
CERTIFICATE OF CORRECTION

PATENT NO.      : 7,133,792 B2
APPLICATION NO. : 09/815568
DATED           : November 7, 2006
INVENTOR(S)     : Rick V. Murakami et al.

It is certified that error appears in the above-identified patent and that said Letters Patent is hereby corrected as shown below:

Column 1, line 31, ". . . Biometrics are the measurement of . . ." change to --Biometrics is the measurement of--

Column 2, line 51, ". . . forged our counterfeit marks." change to --forged or counterfeit marks.--

Column 2, line 57, ". . . fingers rotated mechanically . . ." change to --fingers are rotated mechanically--

Column 2, line 59, ". . . to Shore discloses . . ." change to --to Schiller discloses--

Column 3, line 4, ". . . data an uneven surface such . . ." change to --data on an uneven surface such--

Column 3, line 16, ". . . using to an optical . . ." change to --using an optical--

Column 3, line 17, ". . . to Kito et al. discloses . . ." change to --to Kato et al. discloses--

Column 3, line 39, ". . . to Grippey discloses . . ." change to --to Grippi discloses--

Column 3, line 42, ". . . and their hand written signature." change to --and their handwritten signature.--

Column 3, line 53, ". . . 5,727,439 to Lapsley . . ." change to --5,737,439 to Lapsley--

Column 4, line 21, ". . . glands. the body's skin . . ." change to --glands. The body's skin--

Column 4, line 25, ". . . and articulations, bones generally . . ." change to --and articulations. Bones generally--

Column 4, line 37, ". . . similar degernative effects . . ." change to --similar degenerative effects--

UNITED STATES PATENT AND TRADEMARK OFFICE
CERTIFICATE OF CORRECTION

| | |
|---|---|
| PATENT NO. | : 7,133,792 B2 |
| APPLICATION NO. | : 09/815568 |
| DATED | : November 7, 2006 |
| INVENTOR(S) | : Rick V. Murakami et al. |

It is certified that error appears in the above-identified patent and that said Letters Patent is hereby corrected as shown below:

Column 5, line 40, ". . . calibration biometric markers . . ." change to --calibrating biometric markers--

Column 5, line 44, ". . . and/or are histological . . ." change to --and/or histological--

Column 6, line 14, ". . . markers maybe based . . ." change to --markers may be based--

Column 6, line 31, ". . . skin tissue could be a substantially . . ." change to --skin tissue, a substantially--

Column 6, line 37, ". . . time but that do not require . . ." change to --time but do not require--

Column 6, line 64, ". . . of authenticated, measurements, . . ." change to --of authenticated measurements,--

Column 7, line 4, ". . . embodiment, authenticating template . . ." change to --embodiment, the authenticating template--

Column 7, line 11, ". . . value; calculate the standard . . ." change to --value; calculating the standard--

Column 7, line 12, ". . . value; divide the centroid . . ." change to --value; dividing the centroid--

Column 7, line 14, ". . . value; calculate the probability . . ." change to --value; calculating the probability--

Column 7, line 15, ". . . and input value . . ." change to --and inputting the value--

Column 7, line 26, ". . . embodiment, the a global . . ." change to --embodiment, a global--

Column 7, line 36, ". . . deviation to normalized." change to --deviation to be normalized.--

UNITED STATES PATENT AND TRADEMARK OFFICE
CERTIFICATE OF CORRECTION

PATENT NO. : 7,133,792 B2
APPLICATION NO. : 09/815568
DATED : November 7, 2006
INVENTOR(S) : Rick V. Murakami et al.

It is certified that error appears in the above-identified patent and that said Letters Patent is hereby corrected as shown below:

Column 8, line 20, "... drive or maybe a ..." change to --drive or may be a--

Column 9, line 12, "... undesirably effecting the ..." change to --undesirably affecting the--

Column 10, line 45, "... form the originally ..." change to --from the originally--

Column 11, line 52, "... obtained measuring a ..." change to --obtained by measuring a--

Column 12, line 35, "... are obtained measuring a ..." change to --are obtained by measuring a--

Column 14, line 5, "... are obtained measuring ..." change to --are obtained by measuring--

Signed and Sealed this

Eighteenth Day of March, 2008

JON W. DUDAS
*Director of the United States Patent and Trademark Office*